(12) United States Patent
Streng et al.

(10) Patent No.: US 7,866,435 B2
(45) Date of Patent: Jan. 11, 2011

(54) ELECTRIC POWER STEERING ROTATION ISOLATOR

(75) Inventors: Joseph R. Streng, Freeland, MI (US); Todd A. Barshaw, Saginaw, MI (US); Leroy L. Gatz, Midland, MI (US)

(73) Assignee: Nexteer (Beijing) Technology Co., Ltd.

( * ) Notice: Subject to any disclaimer, the term of this patent is extended or adjusted under 35 U.S.C. 154(b) by 326 days.

(21) Appl. No.: 12/106,801

(22) Filed: Apr. 21, 2008

(65) Prior Publication Data

US 2009/0260914 A1 Oct. 22, 2009

(51) Int. Cl.
*B62D 5/04* (2006.01)
(52) U.S. Cl. ............... 180/444; 180/426; 180/443; 180/446
(58) Field of Classification Search .......... 180/444, 180/443, 446, 426
See application file for complete search history.

(56) References Cited

U.S. PATENT DOCUMENTS

| | | | | |
|---|---|---|---|---|
| 5,738,183 | A * | 4/1998 | Nakajima et al. ........... | 180/444 |
| 5,878,832 | A * | 3/1999 | Olgren et al. .............. | 180/444 |
| 6,044,723 | A * | 4/2000 | Eda et al. ................. | 74/388 PS |
| 6,076,628 | A * | 6/2000 | Pattok et al. ............... | 180/444 |
| 6,378,647 | B1 * | 4/2002 | Birsching et al. ........... | 180/444 |
| 6,389,924 | B1 * | 5/2002 | Ryne et al. ................ | 74/493 |
| 6,412,591 | B1 * | 7/2002 | Endo et al. ................ | 180/427 |
| 6,550,568 | B2 * | 4/2003 | Ross ...................... | 180/444 |
| 6,883,635 | B2 * | 4/2005 | Lynn et al. ................ | 180/444 |
| 6,913,108 | B2 * | 7/2005 | Ikeda ..................... | 180/444 |

* cited by examiner

*Primary Examiner*—Paul N Dickson
*Assistant Examiner*—Michael R Stabley
(74) *Attorney, Agent, or Firm*—Cantor Colburn LLP

(57) ABSTRACT

A steering column assembly includes a column jacket extending along a longitudinal axis and a steering shaft rotatably supported by the column jacket. A power assist module includes a housing coupled to the column jacket and a motor. The motor applies a torque to the steering shaft. An isolator connection interconnects the housing and the column jacket to permit rotational flexure of the power assist module relative to the column jacket, i.e., the power assist module may rotate relative to the column jacket, thereby preventing undesirable rotation of a lever mounted to the column jacket in response to the motor applying the torque to the steering shaft.

26 Claims, 3 Drawing Sheets

ELECTRIC POWER STEERING ROTATION ISOLATOR

BACKGROUND OF THE INVENTION

1. Field of the Invention

The subject invention relates generally to a steering column assembly for a vehicle. More specifically, the subject invention relates to a steering column assembly including a power assist module for supplying a supplemental torque to a steering shaft.

2. Description of the Prior Art

A typical steering column assembly including a power assist module includes a column jacket that extends along a longitudinal axis. A steering shaft is rotatably supported by the column jacket. The power assist module includes a housing configured for attachment to the vehicle and a motor coupled to the steering shaft via a gear system. The motor applies the supplemental torque to the steering shaft to assist in rotating the steering shaft about the longitudinal axis.

The housing of the power assist module is connected to the column jacket. This connection must be properly aligned along the longitudinal axis to permit proper operation of the steering column assembly. Accordingly, it is known to rigidly attach the housing to the column jacket through a bolted connection, i.e., bolts are utilized to interconnect the housing of the power assist module and the column jacket. U.S. Pat. No. 6,389,924 to Ryne et al. discloses a steering column assembly having a power assist module. A column adapter is rigidly attached to the column jacket by welding or the like. The column adapter is configured to fit within a seat defined by the housing of the power assist module. A C-clip is disposed within a groove defined by the housing to restrain the column adapter against the seat. The C-clip includes a beveled edge cooperating with the groove to bias against the column adapter as the C-clip circumferentially expands within the groove, thereby fixing the column adapter in place relative to the housing.

The housing typically includes a pair of cylindrical mounting lugs configured to attaching the power assist module to the vehicle. A fastener, such as a bolt, passes through the mounting lugs for interconnecting the housing and the vehicle. The mounting lugs include a elastomeric, e.g., rubber, bushing to attenuate road noise and vibration. However, these elastomeric bushings permit rotational flexure about the longitudinal axis when resisting the torque applied by the motor of the power assist module. Because of the rigid connection between the housing and the column jacket, the housing transfers this rotational flexure to the column jacket. When the power assist module is applying the torque to the steering shaft, rotation of a blinker stalk mounted to the column jacket, or some other lever mounted to the column jacket, becomes visible. This visible stalk rotation is objectionable and lowers a quality perception of the vehicle.

SUMMARY OF THE INVENTION AND ADVANTAGES

The subject invention provides a steering column assembly for a vehicle. The steering column assembly comprises a column jacket. The column jacket extends along a longitudinal axis. A steering shaft is rotatably supported by the column jacket. A power assist module includes a motor coupled to the steering shaft. The motor applies a torque to the steering shaft. An isolator connection rotatably interconnects the power assist module and the column jacket. The isolator connection permits rotational flexure of the power assist module about the longitudinal axis relative to the column jacket in response to the motor applying the torque to the steering shaft.

Accordingly, the isolator connection prevents the transfer of the rotational flexure of the power assist module to the column jacket, thereby eliminating undesirable rotation of any levers mounted or connected to the column jacket.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a first embodiment of a steering column assembly is generally shown at 20. The steering column assembly 20 is for a vehicle, and rotatably supports a steering wheel (not shown).

Figure 1:
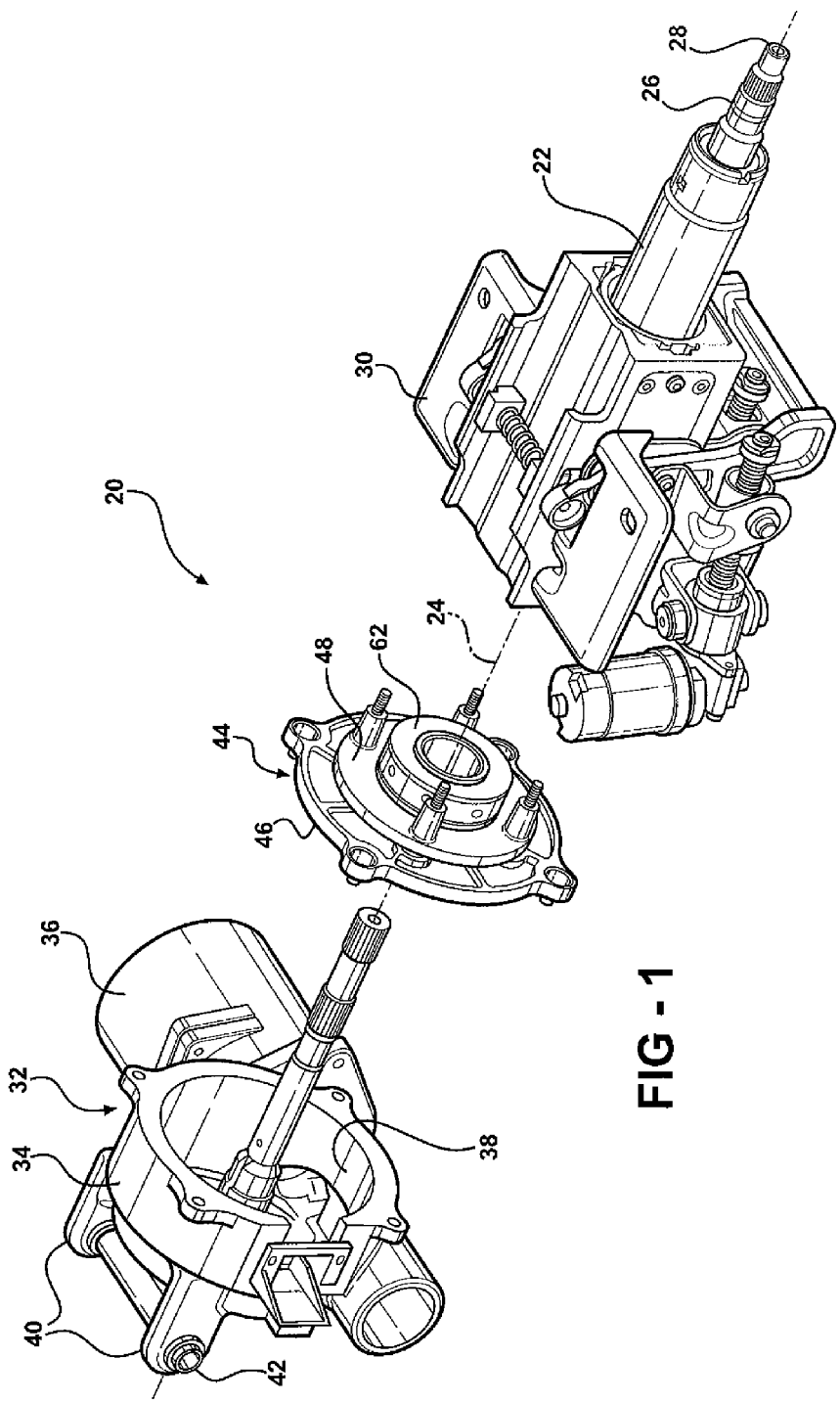
FIG. 1 is a partially exploded perspective view of a steering column assembly.

Referring to FIG. 1, the steering column assembly 20 includes a column jacket 22. The column jacket 22 extends along a longitudinal axis 24. A steering shaft 26 is rotatably supported by the column jacket 22. The steering shaft 26 is rotatable about the longitudinal axis 24. The steering wheel is attached to an upper end 28 of the steering shaft 26 as is well known. A mounting bracket 30 is coupled to the column jacket 22. The mounting bracket 30 is configured for attachment to the vehicle. The mounting bracket 30 may be attached to the vehicle in any suitable manner.

The steering column assembly 20 may be adjustable in a telescopic direction along the longitudinal axis 24 and in a tilt direction about a pivot axis transverse to the longitudinal axis 24. However, it should be appreciated that the steering column assembly 20 is not required to be adjustable. Accordingly, the type and configuration of the mounting bracket 30, and the manner in which the column jacket 22 and the mounting bracket 30 are coupled will vary with the style and adjustability of the steering column assembly 20.

A power assist module 32 is coupled to the column jacket 22. The power assist module 32 includes a housing 34 and a motor 36 mounted to the housing 34. The housing 34 supports the motor 36 and is configured for attachment to the vehicle. The motor 36 is coupled to the steering shaft 26. The motor 36 applies a torque to the steering shaft 26 for supplementing a manual effort applied to the steering wheel to rotate the steering shaft 26. The housing 34 defines an interior chamber 38. A gear system (not shown) is disposed within the interior chamber 38 of the housing 34 and couples the motor 36 to the steering shaft 26. The gear system transfers a rotational output from the motor 36 to the steering shaft 26 as is well known.

The housing 34 includes at least one mounting lug 40 for attaching the power assist module 32 to the vehicle. As shown, the at least one mounting lug 40 includes a pair of mounting lugs 40 extending from the housing 34. The mounting lugs 40 include an elestomeric bushing 42 disposed therein. Preferably, the elastomeric bushing includes a rubber bushing. A bolt extends through a center of the elestomeric bushing 42 to attach the housing 34 to the vehicle. The elastomeric bushing permits rotational flexure between the housing 34 and the vehicle in response to the motor 36 applying the torque to the steering shaft 26.

Figure 3:
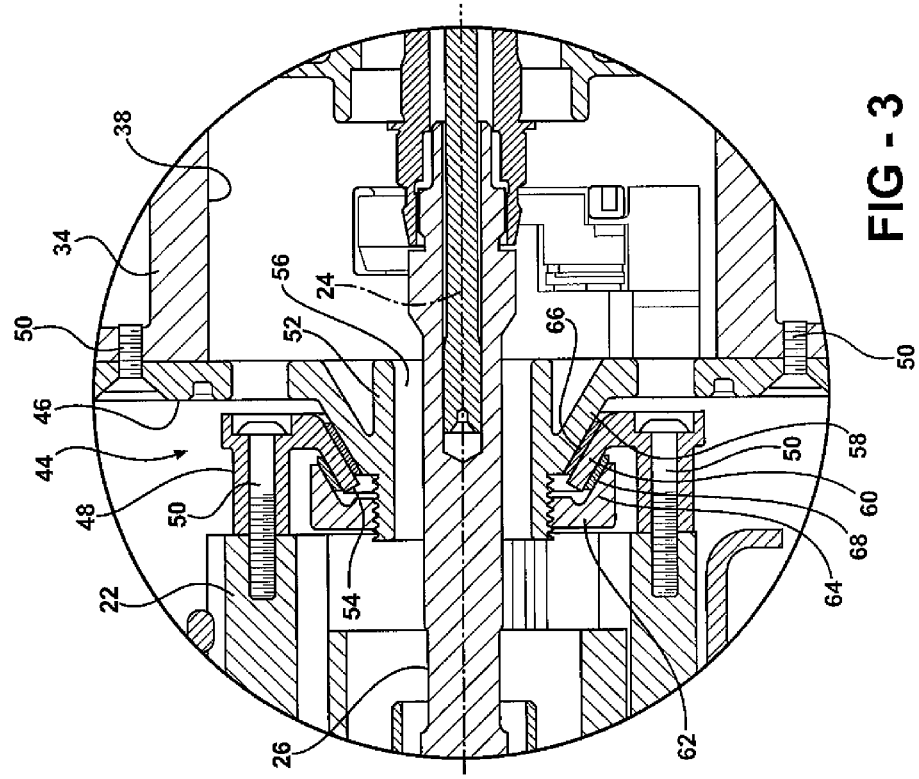
FIG. 3 is a fragmentary longitudinal cross sectional view of the steering column assembly.
Figure 2:
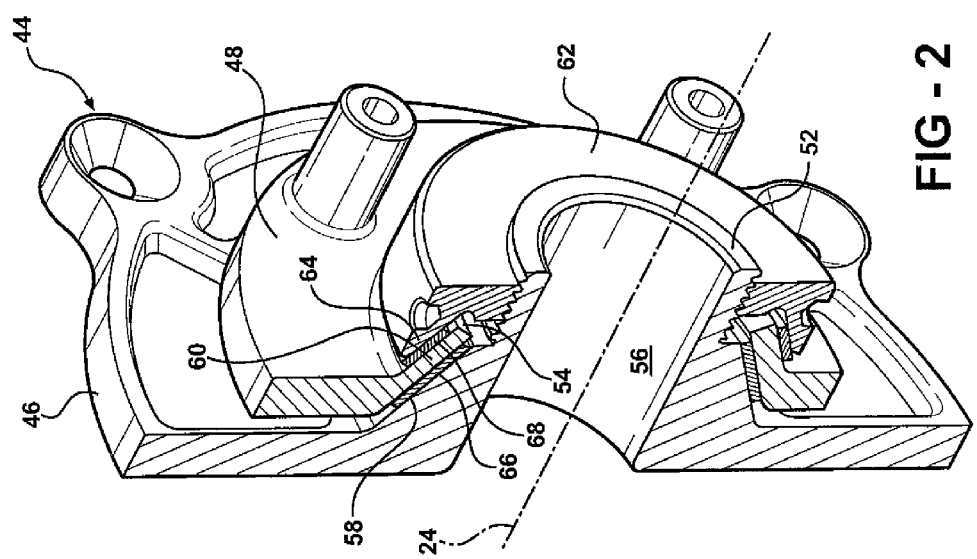
FIG. 2 is an enlarged perspective cross sectional view of an isolator connection of the steering column assembly.

Referring to FIGS. 2 and 3, an isolator connection 44 rotatably interconnects the power assist module 32 and the column jacket 22. Preferably, the isolator connection 44 is attached to both the column jacket 22 and the housing 34 of the power assist module 32. The isolator connection 44 permits rotational flexure of the power assist module 32 about the longitudinal axis 24 relative to the column jacket 22 in response to the motor 36 applying the torque to the steering shaft 26. Accordingly, the housing 34 at the mounting lug 40/vehicle connection resists the torque applied to the steering shaft 26 by the motor 36. However, the elestomeric bushing 42 within the mounting lugs 40 permits the housing 34 and thereby the power assist module 32 to rotatably flex, i.e., twist in response to the torque applied to the steering shaft 26. The isolator connection 44 allows the power assist module 32 to rotate relative to the column jacket 22, thereby preventing transmittal of the rotational flexure, i.e., twisting of the power assist module 32 to the column jacket 22.

The isolator connection 44 includes a cover plate 46 and a column adapter 48. The cover plate 46 is attached to the housing 34. The column adapter 48 is attached to the column jacket 22. Preferably, a plurality of fasteners 50 attach the cover plate 46 to the housing 34 and the column adapter 48 to the column jacket 22. The plurality of fasteners 50 may include bolts in threaded engagement with the housing 34 and the column jacket 22 respectively. However, it should be appreciated that the fasteners 50 may include some other device capable of fixedly attaching the cover plate 46 to the housing 34 and the column adapter 48 to the column jacket 22.

The column adapter 48 is rotatably coupled to the cover plate 46 to permit relative rotation between the cover plate 46 and the column adapter 48 about the longitudinal axis 24. It should be appreciated that the cover plate 46 and the column adapter 48 may be rotationally coupled in any suitable manner. As shown, one of the cover plate 46 and the column adapter 48 includes a shank portion 52. The shank portion 52 is concentric with and extends along the longitudinal axis 24. Another of the cover plate 46 and the column adapter 48 defines an aperture 54. The aperture 54 is concentric with the longitudinal axis 24. The shank portion 52 extends through the aperture 54. Accordingly, it should be appreciated that the cover plate 46 includes one of the shank portion 52 and the aperture 54 and the column adapter 48 includes the other of the shank portion 52 and aperture 54. Preferably and as shown, the cover plate 46 includes the shank portion 52 and the column adapter 48 defines the aperture 54. Therefore, it should be appreciated that the column adapter 48 is rotatably about the shank portion 52 relative to the cover plate 46. However, it should appreciated that the cover plate 46 may alternatively define the aperture 54 and the column adapter 48 may alternatively include the shank portion 52.

The shank portion 52 defines a central bore 56. The central bore 56 is concentric with the longitudinal axis 24. The central bore 56 permits the steering shaft 26 to extend through the isolator connection 44, i.e., the steering shaft 26 extends through the central bore 56.

Preferably, the shank portion 52 includes a tapered section 58. The tapered section 58 is disposed circumferentially about and extends along the longitudinal axis 24. The tapered section 58 of the shank portion 52 is angled relative to the longitudinal axis 24 to define a generally cone shaped seat. Preferably, the aperture 54 includes a radial lip 60. The radial lip 60 is disposed circumferentially about and extends along the longitudinal axis 24. The radial lip 60 is angled relative to the longitudinal axis 24. The tapered section 58 of the shank portion 52 supports the radial lip 60 of the aperture 54, i.e., the radial lip 60 rides on the tapered section 58. The conical shape of the tapered section 58 in cooperation with the angled radial lip 60 cooperate to concentrically locate the aperture 54 and the shank portion 52, i.e., the interaction between the tapered section 58 and the radial lip 60 is self aligning along the longitudinal axis 24. While the isolator connection 44 is shown and has been described to include the self aligning interaction between the cover plate 46 and the column adapter 48, it should be appreciated that the subject invention may be practiced without this self aligning interaction.

The isolator connection 44 further includes a clamp nut 62. The clamp nut 62 is in threaded engagement with the shank portion 52. The clamp nut 62 connects the column adapter 48 and the cover plate 46. Preferably and as shown, the clamp nut 62 includes a radial flange 64. The radial flange 64 is disposed circumferentially about and extends along the longitudinal axis 24. The radial flange 64 is angled relative to the longitudinal axis 24, so that the radial flange 64 partially overlaps the radial lip 60 of the aperture 54. Accordingly, the radial lip 60 of the aperture 54 is sandwiched between the radial flange 64 of the clamp nut 62 and the tapered section 58 of the shank portion 52. It should be appreciated, however, that the clamp nut 62 need not include the radial flange 64.

The steering column assembly 20 may include a locking mechanism, such as a liquid thread adhesive or a mechanical thread lock, to fixedly attach the clamp nut 62 to the shank portion 52. The locking mechanism thereby prevents loosening of the clamp nut 62 and ensures a proper connection between the power assist module 32 and the column jacket 22.

The isolator connection 44 includes a first bushing 66 and a second bushing 68. The first bushing 66 is disposed between the cover plate 46 and the column adapter 48. The second bushing 68 is disposed between the column adapter 48 and the clamp nut 62. The first bushing 66 and the second bushing 68 reduce rotational friction between the cover plate 46 and the column adapter 48 and between the column adapter 48 and the clamp nut 62 respectively.

The isolator connection 44 may also include an electrical isolator. The electrical isolator prevents electrical conduction between the power assist module 32 and the column jacket 22. More specifically, the electrical isolator prevents electrical conduction between the housing 34 and the column jacket 22. Preferably, the electrical isolator comprises the first bushing 66 and the second bushing 68 being manufactured from and including a non-conductive material. The non-conductive material may include a nylon. Alternatively, the non-conductive material may include some other material suitable for reducing rotational friction between the respective rotating features and for not conducting electricity therebetween. It should also be appreciated that the electrical isolator may include some other device or configuration of components that prevents an electrical current from passing between the power assist module 32 and the column jacket 22.

Figure 4:
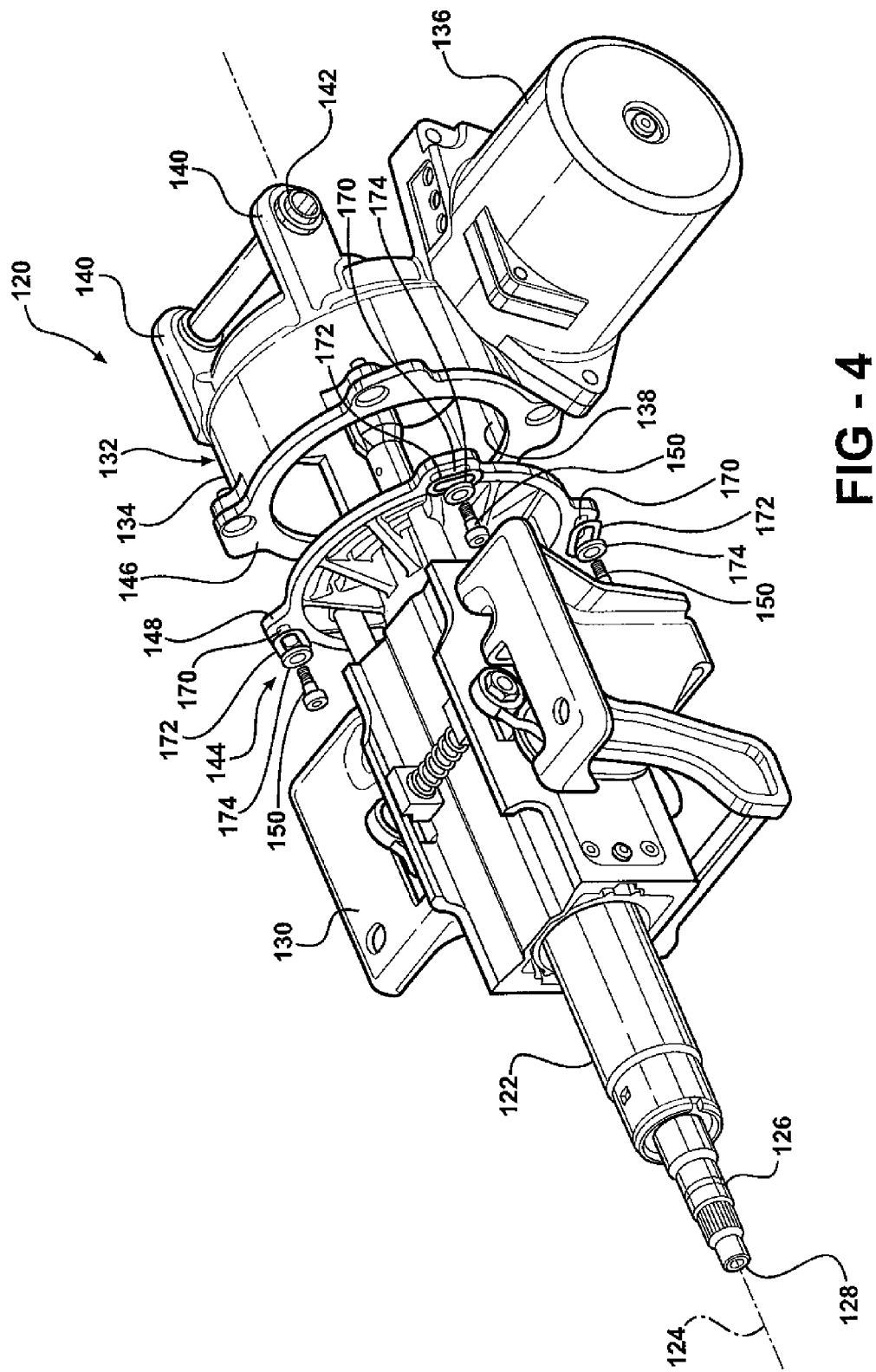
FIG. 4 is a perspective partially exploded view of a second embodiment of the steering column assembly.

Referring to FIG. 4, a second embodiment of the steering column assembly is shown generally at 120. Features of the second embodiment of the steering column assembly 120 similar to features of the first embodiment of the steering column assembly 20 are referenced with the same reference numeral utilized for the first embodiment of the steering column assembly 20 preceded by the numeral 1. For example, the column jacket 22 of the first embodiment of the steering column assembly 20 is reference with the reference numeral 122 in the second embodiment of the steering column assembly 120.

In the second embodiment of the steering column assembly 120, the cover plate 146 is fixedly attached to the housing 134 of the power assist module 132, and the column adapter 148 is fixedly attached to the column jacket 122. The cover plate 146 and the column adapter 148 may be attached to the column jacket 122 and the housing 134 by welding or some other suitable method of attachment. One of the cover plate 146 and the column adapter 148 defines a plurality of slots 170. Preferably and as shown, the plurality of slots 170 includes four slots 170. The slots 170 are radially spaced about the longitudinal axis 124 an equal distance relative to each other. Further more, each of the slots 170 are spaced equidistant from the longitudinal axis 124 relative to each other. The slots 170 are disposed near an outer periphery of one of the cover plate 146 and the column adapter 148. As shown, the column adapter 148 defines the slot 170. However, it should be appreciated that the design could be reversed with the cover plate 146 defining the slots 170.

The second embodiment of the steering column assembly 120 includes plurality of fasteners 150 connecting the cover plate 146 and the column adapter 148. Each of the plurality of fasteners 150 extends through and is moveable within one of the plurality of slots 170. The fasteners 150 extend through the slots 170 into threaded engagement with the one of the cover plate 146 and the column adapter 148 that does not define the slots 170. As shown, the column adapter 148 defines the slots 170 and the fasteners 150 extend through the slots 170 into threaded engagement with the cover plate 146. However, it should be appreciated that the cover plate 146 may define the slots 170 and the fasteners 150 extend through the slots 170 into threaded engagement with the column adapter 148.

In operation, as the motor 136 applies the torque to the steering shaft 126 and the power assist module 132 rotatably flexes as described above, the slots 170 through which the fasteners 150 extend permit the housing 134 and thereby the power assist module 132 to rotate about the longitudinal axis 124 relative to the column jacket 122. Accordingly, rotational flexure is not transmitted to the column jacket 122.

Preferably, the plurality of fasteners 150 include shoulder bolts. However, it should be appreciated that the fasteners 150 may include some other type of device. The shoulder bolts are tightened to a torque which will prevent excessive bending deflection, yet allow relative rotation between the cover plate 146 and the column adapter 148.

A wear plate 172 is disposed about and abuts each of the plurality of slots 170. The wear plate 172 reduces wear on the one of the cover plate 146 and the column adapter 148 that defines the plurality of slots 170. As shown, the wear plate 172 abuts the column adapter 148. A thrust washer 174 is coupled to each of the plurality of fasteners 150, and is disposed between a head portion of the fastener 150 and the wear plate 172. The thrust washer 174 reduces friction between each of the plurality of fasteners 150 and the wear plates 172.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A steering column assembly for a vehicle, said assembly comprising:
   a column jacket extending along a longitudinal axis;
   a steering shaft rotatably supported by said column jacket;
   a power assist module including a motor coupled to said steering shaft for applying a torque to said steering shaft;
   an isolator connection rotatably interconnecting said power assist module and said column jacket for permitting rotational flexure of said power assist module about said longitudinal axis relative to said column jacket in response to said motor applying the torque to said steering shaft; and
   wherein said power assist module includes a housing supporting said motor and configured for attachment to the vehicle and said isolator connection is attached to said housing, said isolator connection including a cover plate attached to said housing and a column adapter attached to said column jacket and rotatably coupled to said cover plate for rotation about said longitudinal axis.

2. An assembly as set forth in claim 1 wherein one of said cover plate and said column adapter includes a shank portion concentric with and extending along said longitudinal axis and another of said cover plate and said column adapter defines an aperture concentric with said longitudinal axis with said shank portion extending through said aperture.

3. An assembly as set forth in claim 2 wherein said cover plate includes said shank portion and said column adapter defines said aperture.

4. An assembly as set forth in claim 2 wherein said cover plate defines said aperture and said column adapter includes said shank portion.

5. An assembly as set forth in claim 2 wherein said isolator connection includes a clamp nut in threaded engagement with said shank portion for connecting said column adapter and said cover plate.

6. An assembly as set forth in claim 5 wherein said shank portion includes a tapered section disposed circumferentially about and extending along said longitudinal axis and angled relative to said longitudinal axis to define a generally cone shaped seat.

7. An assembly as set forth in claim 6 wherein said aperture includes a radial lip disposed circumferentially about and extending along said longitudinal axis and angled relative to said longitudinal axis with said tapered section supporting said radial lip.

8. An assembly as set forth in claim 7 wherein said clamp nut includes a radial flange disposed circumferentially about and extending along said longitudinal axis and angled relative to said longitudinal axis with said radial flange partially overlapping said radial lip of said aperture to sandwich said radial lip between said tapered section and said radial flange.

9. An assembly as set forth in claim 5 wherein said isolator connection includes an electrical isolator for preventing electrical conduction between said housing and said column jacket.

10. An assembly as set forth in claim 9 wherein said isolator connection includes a first bushing disposed between said cover plate and said column adapter.

11. An assembly as set forth in claim 10 wherein said first bushing includes a non-conductive material.

12. An assembly as set forth in claim 9 wherein said isolator connection includes a second bushing disposed between said column adapter and said clamp nut.

13. An assembly as set forth in claim 12 wherein said second bushing includes a non-conductive material.

14. An assembly as set forth in claim 2 wherein said isolator connection includes a plurality of fasteners attaching said cover plate to said housing and said column adapter to said column jacket.

15. An assembly as set forth in claim 1 wherein said isolator connection includes an electrical isolator preventing electrical conduction between said power assist module and said column jacket.

16. An assembly as set forth in claim 1 wherein one of said cover plate and said column adapter define a plurality of slots.

17. An assembly as set forth in claim 16 further comprising a plurality of fasteners with each of said plurality of fasteners extending through and moveable within one of said plurality of slots into threaded engagement with one of said cover plate and said column adapter.

18. An assembly as set forth in claim 17 wherein said plurality of slots are disposed equidistant from and radially about said longitudinal axis.

19. An assembly as set forth in claim 18 further comprising a wear plate disposed about and abutting each of said plurality of slots for reducing wear on said one of said cover plate and said column adapter defining said plurality of slots.

20. An assembly as set forth in claim 19 further comprising a thrust washer coupled to each of said plurality of fasteners for reducing friction between each of said plurality of fasteners and said wear plates.

21. An assembly as set forth in claim 20 wherein said fasteners include shoulder bolts.

22. An assembly as set forth in claim 21 wherein said cover plate is fixedly attached to said housing of said power assist module and said column adapter is fixedly attached to said column jacket.

23. A steering column assembly for a vehicle, said assembly comprising:

a column jacket extending along a longitudinal axis;

a steering shaft rotatably supported by said column jacket;

a power assist module including a motor coupled to said steering shaft for applying a torque to said steering shaft;

an isolator connection rotatably interconnecting said power assist module and said column jacket and configured to permit rotational flexure of said power assist module about said longitudinal axis relative to said column jacket and constrain longitudinal axial movement between said column jacket and said power assist module in response to said motor applying the torque to said steering shaft.

24. The assembly of claim 23, wherein said power assist module includes a housing supporting said motor and configured for attachment to the vehicle and wherein said isolator connection is attached to said housing.

25. The assembly of claim 23, wherein said isolator connection includes a cover plate attached to said power assist module and a column adapter attached to said column jacket and rotatably coupled to said cover plate for rotation about said longitudinal axis.

26. An assembly as set forth in claim 25 wherein one of said cover plate and said column adapter includes a shank portion having a section extending along said longitudinal axis and another of said cover plate and said column adapter defines an aperture, said shank portion section extending through said aperture and fixed therein to constrain axial movement between said cover plate and said column adapter.

* * * * *